US008798435B2

United States Patent
Ivanich et al.

(10) Patent No.: US 8,798,435 B2
(45) Date of Patent: *Aug. 5, 2014

(54) SYSTEMS AND METHODS FOR A COMMON IMAGE DATA ARRAY FILE

(71) Applicant: EchoStar Technologies L.L.C., Englewood, CO (US)

(72) Inventors: William Ivanich, Parker, CO (US); Aarthi Krishnaswamy, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,712

(22) Filed: Jun. 3, 2013

(65) Prior Publication Data

US 2013/0265321 A1 Oct. 10, 2013

Related U.S. Application Data

(63) Continuation of application No. 12/502,021, filed on Jul. 13, 2009, now Pat. No. 8,457,470.

(51) Int. Cl.
*H04N 5/92* (2006.01)
*H04N 5/93* (2006.01)

(52) U.S. Cl.
USPC .......................................... 386/240; 386/239

(58) Field of Classification Search
None
See application file for complete search history.

(56) References Cited

U.S. PATENT DOCUMENTS

2006/0221779 A1 10/2006 Matsushita et al.
2010/0215345 A1 8/2010 Matsuno et al.

*Primary Examiner* — Heather Jones
(74) *Attorney, Agent, or Firm* — Lowe Graham Jones PLLC

(57) ABSTRACT

Image data file systems and methods are operable to generate image data files for a plurality of images having a common image data array, and are operable to generate images from the image data files. An exemplary embodiment stores a common image data array into a master image data file, wherein the stored common image data array corresponds to an image data array of a first image of the plurality of images; and generates a soft link image data file based upon a second image of the plurality of images, wherein an image data array of the second image is the same as the common image data array, and wherein a soft link in the soft link image data file identifies a location of the stored common image data array.

20 Claims, 2 Drawing Sheets though intermediary components (not shown). Further, in alternative embodiments, additional components (not shown) may be included in the soft link image generator 100.

SYSTEMS AND METHODS FOR A COMMON IMAGE DATA ARRAY FILE

PRIORITY CLAIM

This patent application is a Continuation of U.S. Non-Provisional patent application Ser. No. 12/502,021, filed Jul. 13, 2009, published as U.S. Publication No. 2011/0007087, entitled "SYSTEMS AND METHODS FOR A COMMON IMAGE DATA ARRAY FILE," and issued as U.S. Pat. No. 8,457,470 on Jun. 4, 2013, the content of which is herein incorporated by reference in its entirety.

BACKGROUND

Rendered, pixel-based image data files include a file header, a color palette, and an image data array. Such pixel-based images may be relatively large, and thus require a substantial portion of space in a memory medium. An exemplary image data file format could be constructed as:

Image=[HEADER] [PALETTE] [IMAGE DATA ARRAY]

The file header of the pixel-based image includes various information pertaining to the image, such as bitmap width in pixels (the number of pixels in a row of pixels), bitmap height in pixels (the number of pixels in a column of pixels), and number of bits used to define the color of a pixel. For example, if eight (8) bits are used to specify the color of a pixel, then there are a possible 256 different colors that may be used to define pixel color. Any suitable number of bits may be used to define the number of color choices for a pixel (for example, if twelve bits are used, up to 4096 colors are available to define the color for a pixel).

A color palette is a pre-defined, ordered array of elements that define a color value. Each color value includes color information to define the different colors that may be used to color a pixel. For example, the color information specifies a mixture of red, green, and blue colors, along with an intensity value and/or color depth value. The color palette location information defines the location of each array element of the color palette. Accordingly, individual colors of the color palette are indexed by their location in the color palette, and thus are identified by their unique color palette location value.

The image data array is a pre-defined, ordered array of elements that define the image on a pixel-by-pixel basis. For any particular image, the location of a pixel can be identified by its relative location in the image data array since there are n×m pixels in the image data array (where n is the number of pixels in a row of pixels and m is the number of pixels in a column of pixels). Thus, the relative location of the pixel data in the image data array defines the location of the pixel in the image.

The information in any particular array element of the image data array is one of the color palette location information values. Thus, each array element in the image data array points to a particular array element in the color palette (which has the color information for a particular color).

When the image is displayed and/or printed, each of the individual pixels of the image are displayed and/or printed. To print and/or display an individual pixel, the location of the pixel in the image is first determined based upon its relative location in the image data array. For each pixel, the array element of the image data array is retrieved for mapping to the color palette. Thus, the color palette location information retrieved for that pixel maps to the color for that particular pixel. Accordingly, the color information for that pixel is retrieved. That is, since the array element of the image data array specifies the color palette location value of a color in the color palette, the color information for that pixel is retrieved from the color information stored in the color palette for that particular pixel.

Often, a plurality of images, each having identical image data arrays, but with different coloring, are concurrently stored in the memory. Thus, a relatively large portion of memory may be required for image data management. Accordingly, there is a need in the industry to reduce the amount of image data so as to reduce memory requirements.

SUMMARY

Image data file systems and methods are operable to generate image data files for a plurality of images having a common image data array, and are operable to generate images from the image data files. An exemplary embodiment stores a common image data array into a master image data file, wherein the stored common image data array corresponds to an image data array of a first image of the plurality of images; and generates a soft link image data file based upon a second image of the plurality of images, wherein an image data array of the second image is the same as the common image data array, and wherein a soft link in the soft link image data file identifies a location of the stored common image data array.

In accordance with further aspects, an exemplary embodiment retrieves a soft link image data file with a soft link, wherein the soft link image data file corresponds to an image of a plurality of images, wherein the soft link identifies a location of a common image data array in a master image data file, and wherein each of the plurality of images are defined by a respective image data array that is substantially the same as the common image data array; retrieves the common image data array based upon the location identified in the soft link; and generates an image data file for the image, wherein the generated image data file has an image data array based upon the common image data array retrieved from the master image data file.

BRIEF DESCRIPTION OF THE DRAWINGS

Preferred and alternative embodiments are described in detail below with reference to the following drawings.

DETAILED DESCRIPTION

Figure 1:
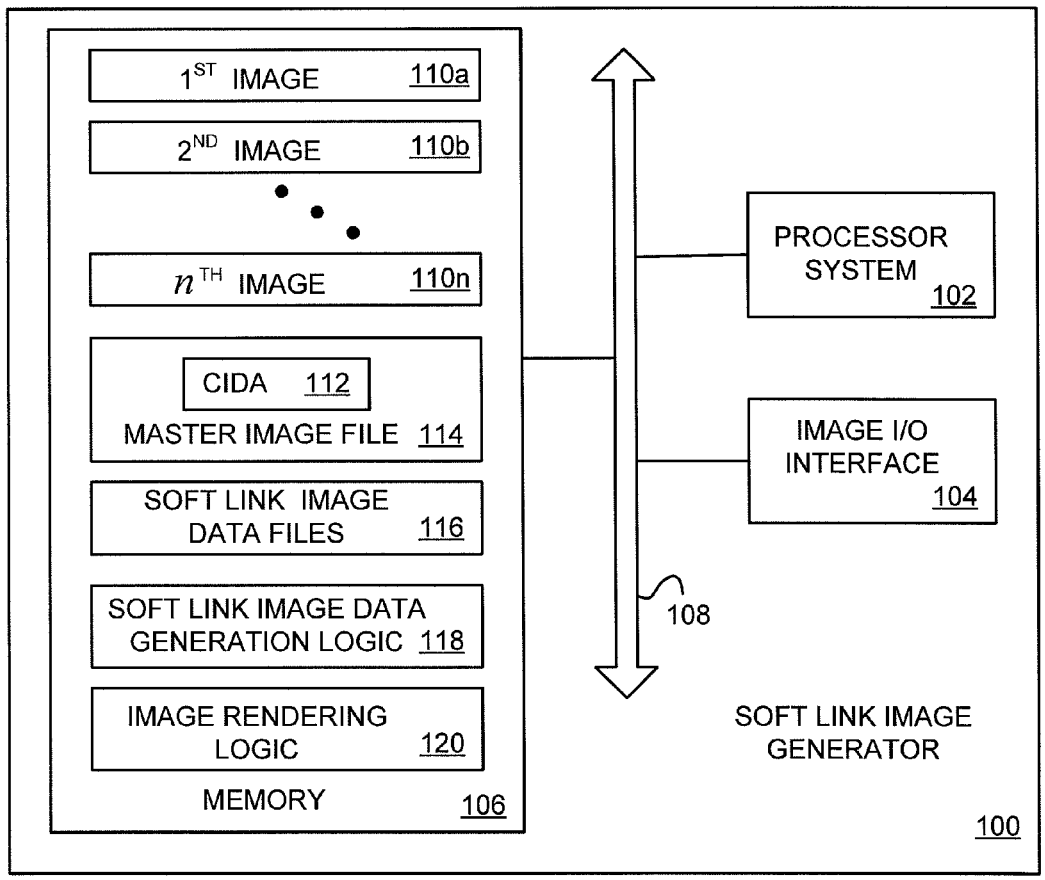
FIG. 1 is a block diagram of an embodiment of a soft link image generator.

FIG. 1 is a block diagram of an embodiment of a soft link image generator 100. In this exemplary embodiment, the soft link image generator 100 comprises a processor system 102, an image input/output (I/O) interface 104, and a memory 106. The processor system 102, the image I/O interface 104, and the memory 106 are communicatively coupled to a communication bus 108, thereby providing connectivity between the above-described components. In alternative embodiments of the soft link image generator 100, the above-described components may be communicatively coupled to each other in a different manner. For example, one or more of the above-described components may be directly coupled to the processor system 102, or may be coupled to the processor system 102 via intermediary components (not shown). Further, additional components (not shown) may be included in alternative embodiments of the soft link image generator 100.

The soft link image generator 100 identifies, from a plurality of image data files associated with a plurality of images, a plurality of image data files that have the same image data array. These images are referred to herein as common array images. Each of the plurality of common array images uses an image data array that is substantially the same, or common, among the plurality of identified common array images. Further, the header of each of the common array images is substantially the same, or common, among the plurality of identified common array images.

Such common array images would differ from each other by having different color palettes. For images 110a-110n having a common image data array (CIDA) 112, the soft link image generator 100 builds a master image data file 114 for a selected one of the identified images 110a-110n. Then, for the remaining images 110a-110n, the soft link image generator 100 builds soft link image data files 116 that use a soft link to point to or otherwise indicate the location of the common image data array 112 residing in the master image data file 114. Accordingly, the soft link image data files 116 do not have their own image data array and are significantly smaller in size (require less memory storage capacity) than their counter-part prior art image data files. That is, the soft link image data files 116 are smaller since they use the common image data array 112 stored as part of the master image data file 114.

Optionally, color pallet information for the remaining images 110a-110n may be included in the master image data file 114. Alternatively, the color pallet information may be stored in the individual soft link image data files 116, or may be stored in another location identified by other soft links or the like.

The image I/O interface 104 receives image information from a remote source (not shown). The received image information corresponds to one or more of the images 110a-110n that are processed by the soft link image generator 100 into the master image data file 114 and the associated soft link image data files 116. For example, the image I/O interface 104 may receive the image information from a remote memory, an image capture device such as a camera or the like, or another suitable device. The image information may be saved into the memory 106, and/or may be directly processed into the master image data file 114 and the associated soft link image data files 116. The received image information may be in any suitable format, such as a pixel-based image format or another, non pixel-based image format.

The memory 106 includes a region for the soft link image data generation logic 118. In this exemplary embodiment, the soft link image data generation logic 118, retrieved and executed by processor system 102, generates the master image data file 114 and the soft link image data files 116.

The memory 106 further includes a region for the image rendering logic 120. The image rendering logic 120 receives image information and generates pixel-based image information for the images 110a-110n, if necessary, that are to be combined into the master image data file 114 and the associated soft link image data files 116. Pixel-based image information may be saved into the memory 106, and/or may be directly processed into the master image data file 114 and the associated soft link image data files 116.

Figure 2:
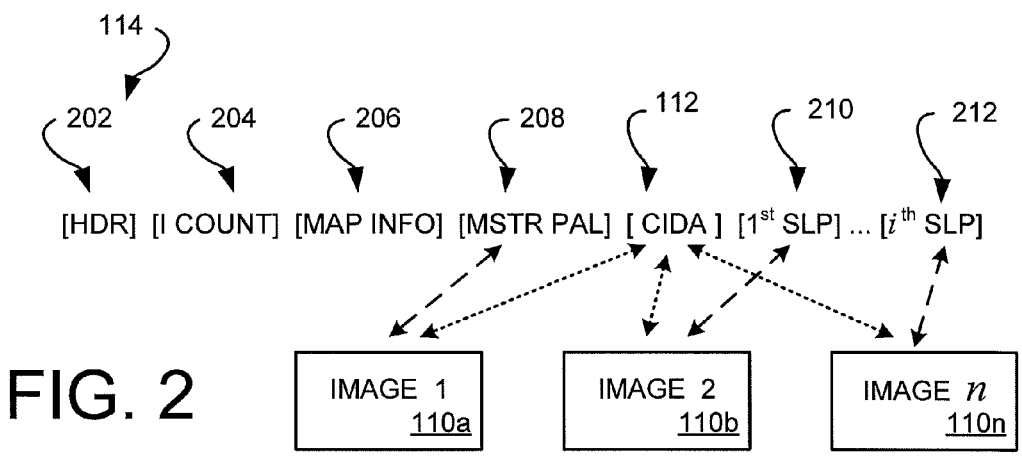
FIG. 2 is a block diagram of a file format of an exemplary master image data file.

FIG. 2 is a block diagram of a file format of an exemplary master image data file 114. The exemplary master image data file 114 comprises a file header (HDR) 202, an image count (I COUNT) 204, map information (MAP INFO) 206, a master color palette (MSTR PAL) 208, the common image data array 112, a first soft link color palette ($1^{st}$ SLP), through the $i^{th}$ soft link color palette ($i^{th}$ SLP). In alternative embodiments, the information in the master image data file 114 may have a different order, may omit some of the information, and/or may include other information of interest.

The file header 202 includes various information pertaining to the selected one of the images 110a-110n used to build the master image data file 114. The header 202 may include information such as bitmap width in pixels (the number of pixels in a row of pixels), bitmap height in pixels (the number of pixels in a column of pixels), and number of bits used to define the color of a pixel. For example, if eight (8) bits are used to specify the color of a pixel, then there are a possible 256 different colors that may be used to define pixel color. Any suitable number of bits may be used to define the number of color choices for a pixel (for example, if twelve bits are used, up to 4096 colors are available to define the color for a pixel).

The image count 204 indicates the number of images 110a-110n that the master image data file 114 supports. The map information 206 is used by the soft link image data generation logic 118 to determine which color palette to use for a given one of the images 110a-110n. A number is associated with each file name for each of the images 110a-110n. This number is used to index into the mapping information to find out what color palette would be used for a particular one of the images 110a-110n that is being generated.

The common image data array 112 is a pre-defined, ordered array of elements that define the images 110a-110n on a pixel-by-pixel basis. For any particular one of the images 110a-110n, the location of a pixel can be identified by its relative location in the image data array 112 since there are n×m pixels in the image data array (where n is the number of pixels in a row of pixels and m is the number of pixels in a column of pixels). Thus, the relative location of the pixel data in the image data array 112 defines the location of the pixel in the images 110a-110n.

The common image data array 112 is applicable to each one of the images 110a-110n. That is, the common image data array 112 is the same for each of the images 110a-110n.

The master color palette 208 defines pixel colors for the selected one of the images 110a-110n that is used to generate the master image data file 114. The $1^{st}$ soft link color palette 210 is a color palette that defines pixel colors for a second one of the images 110a-110n. Each of the images 110a-110n (except the image selected to generate the master image data file 114) has its own unique soft link color palette. Here, the $i^{th}$ soft link color palette 210 is a color palette that corresponds to the $n^{th}$ one of the images 110a-110n.

FIG. 2 graphically illustrates the relationship between a plurality of images 110a, 110b and 110n and the master image data file 114. Each of the images 110a, 110b and 110n use the same image data array 112. The first image 110a is selected as the base image that is used to build the master image data file 114. Selection of a particular image from the plurality of images 110a, 110b and 110n to be the master image may be arbitrary, or may be based upon any suitable selection criteria.

Thus, when the master image data file 114 is built by the soft link image generator 100, an exemplary process starts with the retrieval of the header 202 from the pixel-based image data file for the selected image 110a. Any suitable information may be saved into the header 202. (It is appreciated that components of the master image data file 114 may be generated in any desired order.)

Previously, the soft link image generator 100 has identified the images 110a-110n (each having the same common image data array 112) from a plurality of images. The number of the images 110a-110n, here n images, is determined. The optional image count 204 is set to the determined number of images (here the number n) that the master image data file 114 supports.

The map information 206 is used by the soft link image data generation logic 118 to decide which color palette to use for a given one of the images 110a-110n. Since the image data for each of the images 110a-110n is available, information pertaining to their respective color palettes is available. This optional information is used to generate the map information 206.

Since all of the images 110a-110n use the same common image data array 112, the common image data array 112 from the selected base image, here image 101a, is retrieved and saved as the common image data array 112. When any of the images 110a-110n are generated for display and/or printing, the common image data array 112 is used to render the desired image.

The remaining ones of the images 110b-110n (the images not selected as the master image) each have a unique color palette that is different from the base image (the one of the images 110a used to generate the master image data file 114). These color palettes are then retrieved from each of the image data files and saved, in this exemplary embodiment, into the master image data file 114. Here, the color palette information from the image data corresponding to the image 110b is retrieved and saved into the master image data file 114 as the first ($1^{st}$) soft link color palette 210. It is appreciated that there is likely no significant difference between the color palette information of the image data file for the image 102b and the color palette information saved into the first soft link color palette 210 portion of the master image data file 114.

Color palette image information for the remaining ones of the images are similarly processed. Thus, the color palette information from the image data corresponding to the last one of the images 110n is retrieved and saved into the master image data file 114 as the $i^{th}$ soft link color palette 212.

After the master image data file 114 has been generated, the soft link image data files 116 are generated for the images 110b-110n. Each soft link image data file 116 is a special type of file that contains a reference to the master image data file 114 in the form of an absolute or relative path and that affects pathname resolution.

A soft link contains a text string that is interpreted and followed by the operating system as a path to another file or directory. The soft link is a file on its own and can exist independently of its target, here selected portions of the master image data file 114. If a soft link is deleted, its target remains unaffected. If the target is moved, renamed or deleted, any symbolic link that used to point to it continues to exist but now points to a non-existing file. Here, each of the soft link image data files 116 indentifies the master image data file 114 and which one of the soft link color pallets is associated with that particular image.

When one of the images 110a-110n is selected for display and/or printing, the respective soft link image data file 116 for that image is accessed by a program that is rendering the selected image for display and/or printing. The rendering program then uses the header 202, the common image data array 112, and the associated soft link color palette for the selected image retrieved from the master image data file 114 to generate an image data file for the image. In an exemplary embodiment, the soft link image data generation logic 118 retrieves the header 202, the common image data array 112 and the appropriate color palette information and assembles a pixel-based image data file.

After the master image data file 114 and the soft link image data files 116 have been generated, the plurality of original image data files may be deleted. Accordingly, the memory capacity used to store information for the plurality of images corresponding to the master image data file 114 and the soft link image data files 116 is reduced since the total size of the combined master image data file 114 and soft link image data files 116 is less than the memory size required for all of the original image data files.

Figure 3:
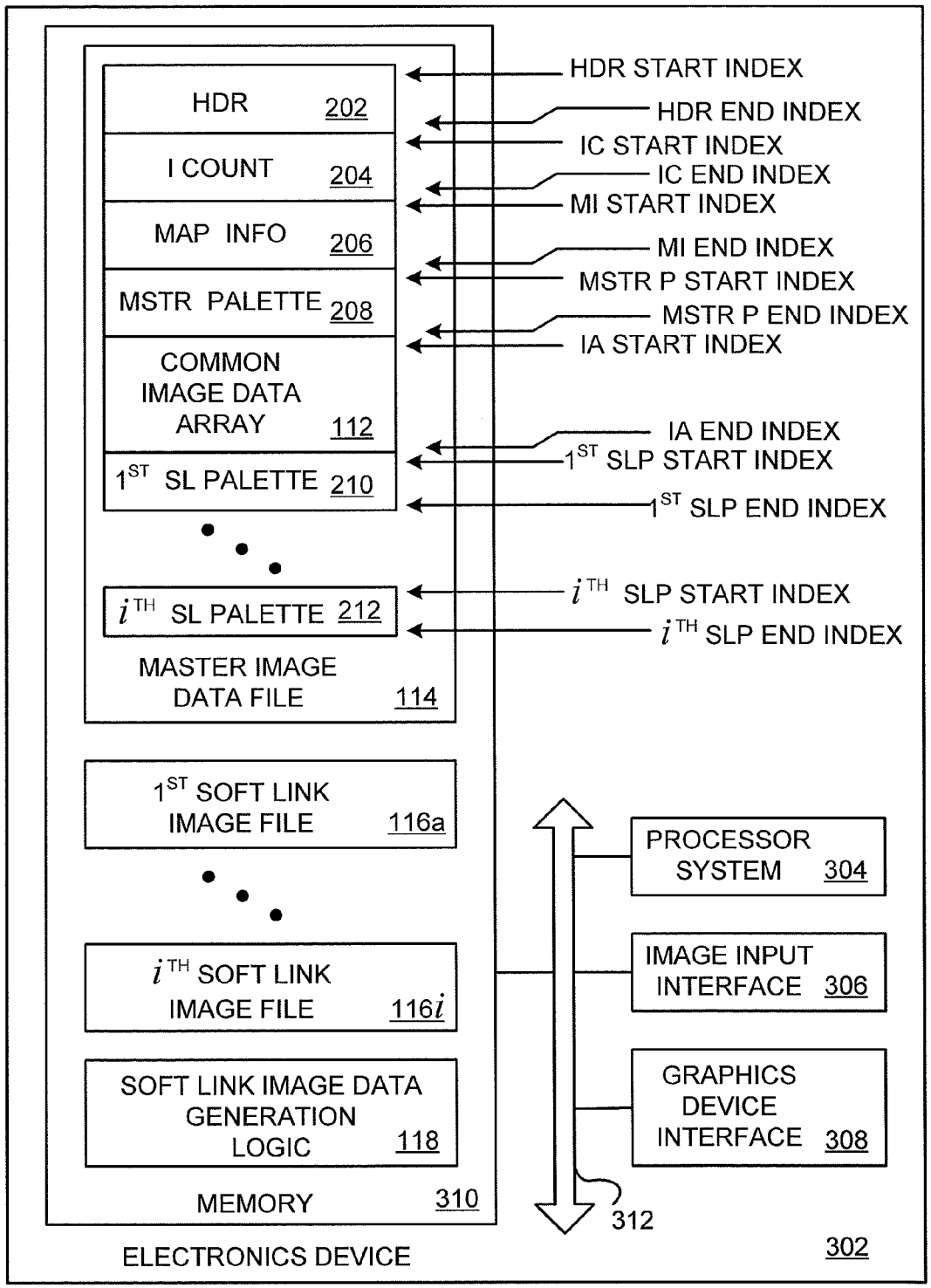
FIG. 3 is a block diagram of an exemplary electronics device having an embodiment of the soft link image generator.

FIG. 3 is a block diagram of an exemplary electronics device 302 having an embodiment of the soft link image generator 100. The soft link image generator 100 embodied in the electronics device 302 generates selected ones of the images 110a-110n, using the master image data file 114 and the soft link image data files 116. The generated images may be displayed, printed, and/or communicated to another device. Accordingly, the electronics device 302 may be communicatively coupled to a display device and/or a printing device, or may itself be a display device and/or a printing device. Non-limiting examples of an electronics device 302 include a set top box (STB), televisions (TVs), digital video disc (DVD) players, digital video recorders (DVRs), personal device assistants (PDAs), personal computers (PCs), or laptop computers.

This exemplary electronics device 302 embodied with the soft link image generator 100 comprises a processor system 304, an image input interface 306, a graphics device interface 308, and a memory 310. The memory 310 includes portions for storing the soft link image generation logic 118, the master image data file 114, and one or more soft link image data files 116a-116i.

The processor system 304, the image input interface 306, the graphics device interface 308, and the memory 310 are communicatively coupled to a communication bus 312, thereby providing connectivity between the above-described components. In alternative embodiments of the soft link image generator 100, the above-described components may be communicatively coupled to each other in a different manner. For example, one or more of the above-described components may be directly coupled to the processor system 304, or may be coupled to the processor system 304 via intermediary components (not shown). Further, additional components (not shown) may be included in alternative embodiments of the soft link image generator 100.

The image input interface 306 receives information corresponding to the master image data file 114 and the soft link image data files 116a-116i from a remote source (not shown). For example, the master image data file 114 and the soft link image data files 116a-116i may be received from the embodiment of the soft link image generator 100 of FIG. 1. Alternatively, or additionally, the image input interface 306 may receive the master image data file 114 and the soft link image data files 116a-116i from a remote memory, an image capture device such as a camera or the like having a soft link image generator 100, or another suitable device. The received master image data file 114 and the soft link image data files 116a-116i may be saved into the memory 310, and/or may be directly processed into one or more of the images 110a-110n.

The graphics device interface 308 communicatively couples the electronics device 302 to another device, such as a media presentation device with a display, a printer, or another processor system. Thus, generated images can be communicated out from the electronics device 302.

In this exemplary embodiment, the soft link image data generation logic 118, retrieved and executed by processor system 102, generates selected ones of the images 110a-110n from the master image data file 114 and/or the soft link image data files 116. If the exemplary image 110a, which was used to generate the master image data file 114, is to be generated, the soft link image generation logic 118 executes a suitable rendering algorithm or the like using the master image data file 114. Thus, the file header (HDR) 202, the master color palette (MSTR PAL) 208, and the common image data array 112 are retrieved such that the image 110a is generated.

In this exemplary embodiment, the soft link image data generation logic 118 generates selected ones of the images 110b-110n from the master image data file 114 and the corresponding one of the soft link image data files 116a-116i. Indexes, pointer values, or the like, correspond to start and end locations of the memory media where the file header (HDR) 202, the image count (I COUNT) 204, the map information (MAP INFO) 206, the master color palette (MSTR PAL) 208, the common image data array 112, and the first soft link color palette ($1^{st}$ SLP) through the $i^{th}$ soft link color palette ($i^{th}$ SLP) reside in the memory 310. These media locations are referred to as a "start index" and an "end index" herein.

If one of the other ones of the images 110b-110n (the images not selected as the master image used to generate the master image data file 114), the soft link image generation logic 118 executes a suitable rendering algorithm or the like using the soft link image data files 116 that corresponds to the selected image. For example, if the image 110b corresponding to the $1^{st}$ soft link image data file 116a is to be generated for printing, then a soft link in the $1^{st}$ soft link image data file 116a points to, or otherwise indicates where in the memory media, the file header (HDR) 202, the $1^{st}$ color palette 212, and the common image data array 112 can be found. The soft link image generation logic 118 then uses the three files to generate the image 110b.

In alternative embodiments, the color palette information for a particular image may be saved in the soft link image data files 116a-116i. Here, when the image is generated, the soft link need only provide direction to the common image data array 112. Alternatively, or additionally, the header 202 and/or other information of interest may be stored in the soft link image data files 116a-116i. In such embodiments, the generated master image data file 114 and associated soft link image data files 116a-116i still result in significant saving in memory medium capacity since the common image data array 112 of the images 110a-110n is the largest portion of the image data.

Since the exemplary soft link image generator 100 illustrated in FIG. 3 is operable to generate images from the master image data file 114 and/or the associated soft link image data files 116, this embodiment may optionally exclude the functionality of identifying, from a plurality of images, those images that have the same image data array, building the master image data file 114 for a selected one of the identified images 110a-110n, and then for the remaining images 110a-110n, building soft link image data files 116. Similarly, the exemplary soft link image generator 100 illustrated in FIG. 1 may optionally exclude the functionality of generating images from the master image data file 114 and the associated soft link image data files 116 for display and/or printing.

It should be emphasized that the above-described embodiments of the soft link image generator 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method for generating image data for a plurality of images, wherein each image is defined by an image data array and a color palette, and wherein each of a plurality of elements of the image data array uniquely defines a location of a pixel in their respective image and a color location in the color palette of a desired color that defined the pixel, the method comprising:
   selecting at least a portion of a first image of the plurality of images,
      wherein the selected portion of the first image is defined by a portion of the image data array of the first image and a first color palette,
      wherein other ones of the plurality of images each have a corresponding portion of their respective image data array that is the same as the portion of the image data array of the first image, and
      wherein the color palette of each of the plurality of images are different;
   generating a master image data file, wherein the master image data file comprises:
      a common image data array, wherein the common image data array is the same as the portion of the image data array of the first image that corresponds to the selected portion of the first image,
      the color palette of the first image, and
      the color palettes of each of the other plurality of images; and
   storing the generated master image data file in a memory medium.

2. The method of claim 1, wherein the master image data file further comprises:
   an image count that identifies a number of the plurality of images that have portions of their image data array in the master image data file.

3. The method of claim 1, wherein the master image data file further comprises:
   a header corresponding to a header of the first image.

4. The method of claim 3, wherein the header in the master image data file comprises:
   start location information defining a start location of the common image data array in the master image data file; and
   location information defining locations of each of the color palettes in the master image data file.

5. The method of claim 4, wherein the storing further comprises:
   storing location information in the memory medium defining where the master image data file resides in the memory medium.

6. The method of claim 1, further comprising:
   receiving a soft link image data file during a rendering of a selected one of the plurality of images,
   wherein the soft link image data file identifies the common image data array in the master image data file and one of the color palettes associated with the selected image.

7. The method of claim 6, wherein the soft link image data file identifies a storage location of the master image data file, and wherein the soft link image data file identifies the color palette of the selected image by a location of the color palette in the master image data file.

8. The method of claim 1, further comprising:
   generating a soft link image data file associated with a selected one of the images of the plurality of images, wherein the soft link image data file includes image identification information that identifies the selected image, wherein the soft link image data file identifies the common image data array in the master image data file, and wherein the soft link image data file identifies the color palette of the selected image that resides in the master image data file.

9. The method of claim 1, further comprising:

generating a plurality of soft link image data files, wherein each soft link image data file includes image identification information that identifies an associated one of the plurality of images, wherein each soft link image data file identifies the common image data array in the master image data file, and wherein each soft link image data file identifies the color palette of the associated image that resides in the master image data file.

10. The method of claim 9, further comprising:

communicating the master image data file and at least one of the plurality of soft link image data files to a remote device.

11. The method of claim 10, wherein the memory medium is a first memory medium, wherein each soft link image data file identifies a location of the master image data file in the first memory medium, and further comprising:

storing the master image data file and the plurality of soft link image data files in a second memory medium of the remote device, wherein a storage location of the master image data file is stored at a known storage location in the second memory media of the remote device; and updating each of the received plurality of soft link image data files to identify the known storage location of the master image data file that is stored in the second memory medium of the remote device.

12. A method for generating image data for a plurality of images, wherein each image is defined by an image data array and a color palette, and wherein each of a plurality of elements of the image data array uniquely defines a location of a pixel in their respective image and a color location in the color palette that defines a desired color of the pixel, the method comprising:

selecting a first image from the plurality of images;

storing in a master image data file the image data array of the first image; and storing each of the color palettes of the plurality of images into the master image data file, wherein a selected one of the images is rendered by retrieving the stored image data array and the color palette associated with the selected image.

13. The method of claim 12, further comprising:

storing a header into the master image data file, wherein the header identifies storage locations in the master image data file for the image data array and each of the color palettes relative to a start location of the master image data file.

14. The method of claim 12, wherein the master image data file is stored at a known location of a memory medium, and further comprising:

storing a header into the master image data file, wherein the header identifies storage locations in the master image data file for the image data array and each of the color palettes, and wherein the storage locations are referenced to the known storage location.

15. The method of claim 12, further comprising:

receiving a soft link image data file during a rendering of a selected one of the plurality of images, wherein the soft link image data file identifies the image data array in the master image data file and one of the color palettes associated with the selected image.

16. The method of claim 12, further comprising:

generating a soft link image data file associated with a selected one of the images of the plurality of images, wherein each soft link image data file includes image identification information that identifies the selected image, wherein each soft link image data file identifies the image data array in the master image data file, and wherein each soft link image data file identifies the color palette of the selected image that is in the master image data file.

17. The method of claim 12, further comprising:

communicating the master image data file and at least one of a plurality of soft link image data files to a remote device.

18. An image data generating system, comprising:

an interface configured to receive a plurality of images, wherein each image is defined by an image data array and a color palette, and wherein each of a plurality of elements of the image data array uniquely defines a location of a pixel in their respective image and a color location in the color palette that defines a desired color of the pixel; and a processor system communicatively coupled to the memory, and operable to:

select at least a portion of a first image of the plurality of images, wherein the selected portion of the first image is defined by a portion of the image data array of the first image and a first color palette, wherein other ones of the plurality of images each have a corresponding portion of their respective image data array that is the same as the portion of the image data array of the first image, and wherein the color palette of each of the plurality of images are different;

generate a master image data file, wherein the master image data file comprises:

a common image data array, wherein the common image data array is the same as the portion of the image data array of the first image that corresponds to the selected portion of the first image, the color palette of the first image, and the color palettes of each of the other plurality of images.

19. The image data generating system of claim 18, further comprising:

a memory configured to store the generated master image data file, and configured to store a soft link image data file, wherein the soft link image data file is configured to render a selected one of the images of the plurality of images, wherein the soft link image data file includes image identification information that identifies the selected image, wherein the soft link image data file identifies the common image data array in the master image data file, and wherein the soft link image data file identifies the color palette of the selected image that is in the master image data file.

20. The image data generating system of claim 18, further comprising:

an interface configured to couple the image data generating system to a remote device, wherein the master image data file and the soft link image data file are communicated from the image data generating system to the remote device via the interface.

* * * * *